(12) United States Patent
Yoo

(10) Patent No.: US 8,662,023 B2
(45) Date of Patent: Mar. 4, 2014

(54) STEAM BOILER

(75) Inventor: Ho Moog Yoo, Busan (KR)

(73) Assignee: SJE Corporation, Ltd. (KR)

(*) Notice: Subject to any disclaimer, the term of this patent is extended or adjusted under 35 U.S.C. 154(b) by 496 days.

(21) Appl. No.: 13/088,023

(22) Filed: Apr. 15, 2011

(65) Prior Publication Data

US 2012/0204815 A1 Aug. 16, 2012

(30) Foreign Application Priority Data

Feb. 14, 2011 (KR) .................. 10-2011-0012714

(51) Int. Cl.
*F22B 37/10* (2006.01)

(52) U.S. Cl.
USPC .................. 122/235.11; 122/33; 122/253

(58) Field of Classification Search
USPC .............. 122/31.1, 33, 53, 57, 77, 95.1, 95.2, 122/235.28, 253, 44.1, 235.11, 209.2
See application file for complete search history.

(56) References Cited

U.S. PATENT DOCUMENTS

| 2,048,446 A * | 7/1936 | Hays ................... 122/367.4 |
| 2,684,663 A * | 7/1954 | Oxford ................. 122/275 |
| 4,393,814 A * | 7/1983 | Sievert ................ 122/22 |
| 4,465,025 A * | 8/1984 | Schroder ............. 122/235.11 |
| 4,569,310 A * | 2/1986 | Davis .................. 122/24 |
| 7,232,471 B2 * | 6/2007 | Tamura et al. ......... 48/61 |

FOREIGN PATENT DOCUMENTS

| JP | 55003525 A * | 1/1980 | ............ F23D 11/36 |
| KR | 10-0798327 | 1/2008 | |
| KR | 10-0806720 | 2/2008 | |

* cited by examiner

*Primary Examiner* — Gregory A Wilson
(74) *Attorney, Agent, or Firm* — Cantor Colburn LLP

(57) ABSTRACT

A steam boiler, comprising a boiler body accommodating water and steam therein and a burner throwing flames toward a central through-hole of the boiler body and water pipes formed to cross the inside of the central through-hole of the boiler body, and directly heated by the flames of the burner and an internal cylinder formed to cover the outside of the boiler body so as to form a space between the internal cylinder and the outer wall surface of the boiler body where burned discharge gas flows from the lower side to the upper side and an external cylinder formed to cover the outside of the internal cylinder so as to form a space between the external cylinder and the outer wall surface of the internal cylinder where air for combustion flow such that heat exchange between the air for combustion and the discharge gas is performed.

2 Claims, 5 Drawing Sheets

STEAM BOILER

CROSS-REFERENCE TO RELATED APPLICATIONS

This application claims priority under 35 U.S.C. §119 to Korean Patent Application No. 10-2011-0012714, filed on Feb. 14, 2011, in the Korean Intellectual Property Office, the disclosure of which is incorporated herein by reference in its entirety.

TECHNICAL FIELD

The present invention relates to a steam boiler technology for fusing a structure of a smoke-pipe-type boiler and a structure of a water-pipe-type boiler, and particularly, to an eco-friendly steam boiler capable of significantly reducing the boiler weight and size while maximizing combustion efficiency by using all advantages of both boilers.

The present invention suggests a combustion-type steam boiler structure using oil or diesel whose evaporation amount per hour is in a range of 50 kg to 200 kg, and the present invention is a revolutionary invention which is applicable to various products such as an industrial steam cleaner, a steam washer, a steam car washer, etc.

BACKGROUND

Boilers are classified into a smoke pipe type and a water pipe type. The smoke pipe type generally used for household or small-sized combustion-type boilers is configured such that high-temperature combustion gas flows in a boiler pipe and the outside of the pipe is surrounded with water. A smoke-pipe-type boiler is light and can be easily handled. However, due to a limit of the outside area of the pipe, the heat transfer amount is small and thus heat efficiency is low.

Meanwhile, the water-pipe-type boiler generally applied to high-capacity boilers for ships or industrial field is configured such that water exists inside a boiler pipe and combustion gas is brought into contact with the outside of the pipe for heat transfer. Therefore, the water-pipe-type boiler has higher heat efficiency than the smoke-pipe-type boiler. However, the weight and size are large and thus the water-pipe-type boiler is not suitable for being applied to a general steam car washer.

Also, in a general steam boiler, cool air (oxygen) is injected into a combustion chamber. However, in this case, the combustion efficiency is very low. In particular, a low atmospheric temperature in a cold country or during winter continuously causes incomplete combustion such that smoke and soot are generated. Therefore, global warming problem due to fossil fuel may occur.

The common disadvantage of the general smoke-pipe-type and water-pipe-type boilers is that, for insulation, a heat insulating material should be necessarily additionally provided and attached to the outside of the main body of the boiler. As the heat insulating material, asbestos, plaster, glass fiber, or the like are used. However, these materials become a factor threatening health of a worker during manufacture, and may increase the manufacture cost and the volume and weight of the boiler.

The present invention proposes a new type of steam boiler taking all advantages of the smoke-pipe-type and the water-pipe-type boilers, and making it unnecessary to provide a heat insulating material to the main body of the boiler.

Further, waste heat of discharge gas is used to preheat cool air for combustion, and thus it is possible to further improve heat efficiency.

SUMMARY

The present invention has been made in an effort to provide a smoke-pipe-type-cum-water-pipe-type steam boiler capable of having the same heat efficiency as a water-pipe-type boiler while having a light small-sized structure which is the advantage of a smoke-pipe-type boiler.

Further, the present invention has been made in an effort to provide a steam boiler which takes an up/down-type combustion method to increase stay time of high-temperature gas in the vicinity of the boiler such that air for combustion is preheated with waste heat of the discharge gas, thereby significantly improving heat efficiency.

Furthermore, the present invention has been made in an effort to provide a steam boiler which has an outside wall surface where a heat exchange structure is provided between air for combustion and discharge gas such that it is not necessarily required to separately provide a heat insulating material using asbestos or the like unlike existing boilers.

Other features and aspects will be apparent from the following detailed description, the drawings, and the claims.

DETAILED DESCRIPTION OF EMBODIMENTS

Figure 1:
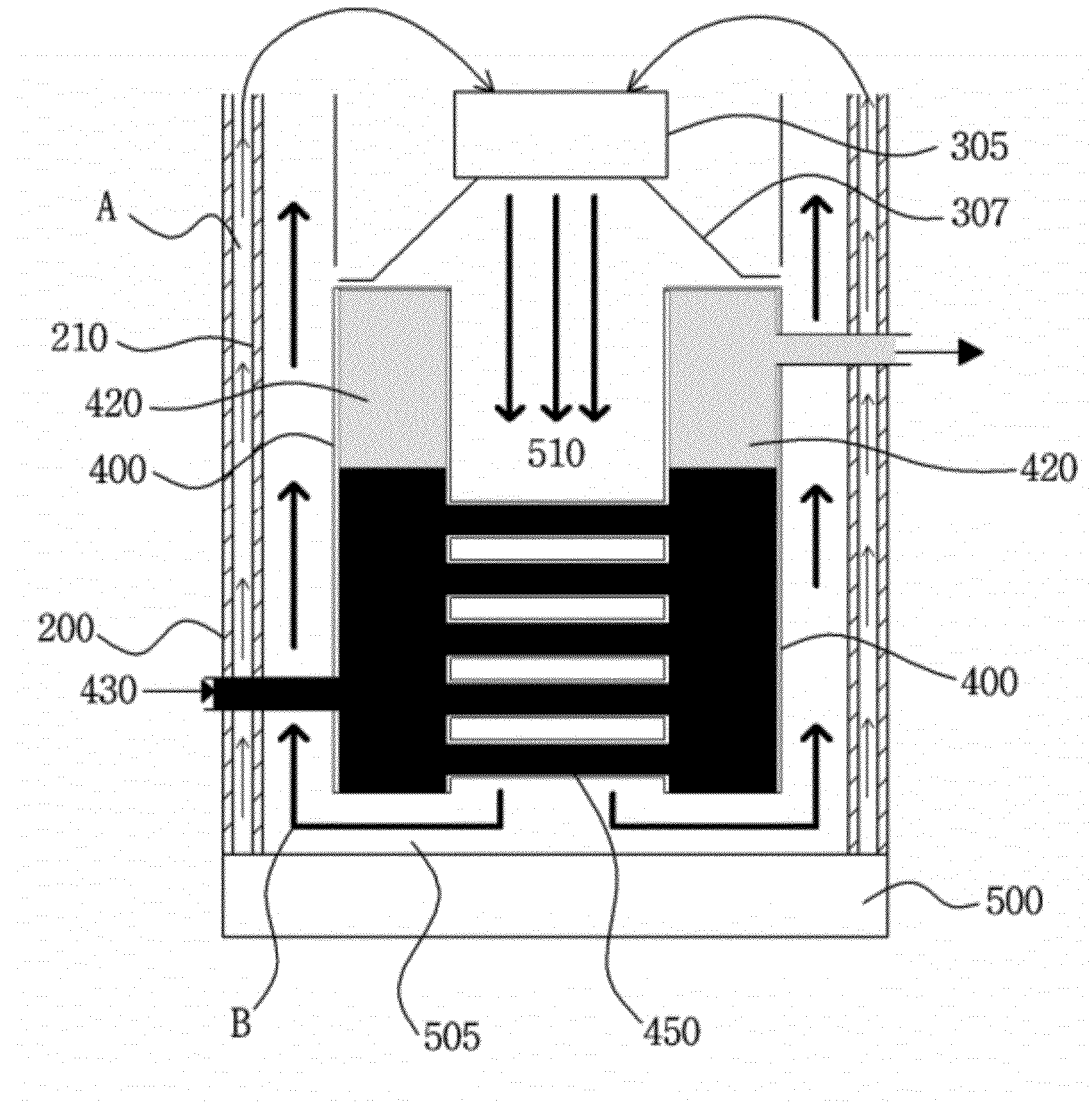
FIG. 1 is a schematic diagram illustrating a concept of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments of the present invention will be described in detail with reference to the accompanying drawings.

Figure 2:
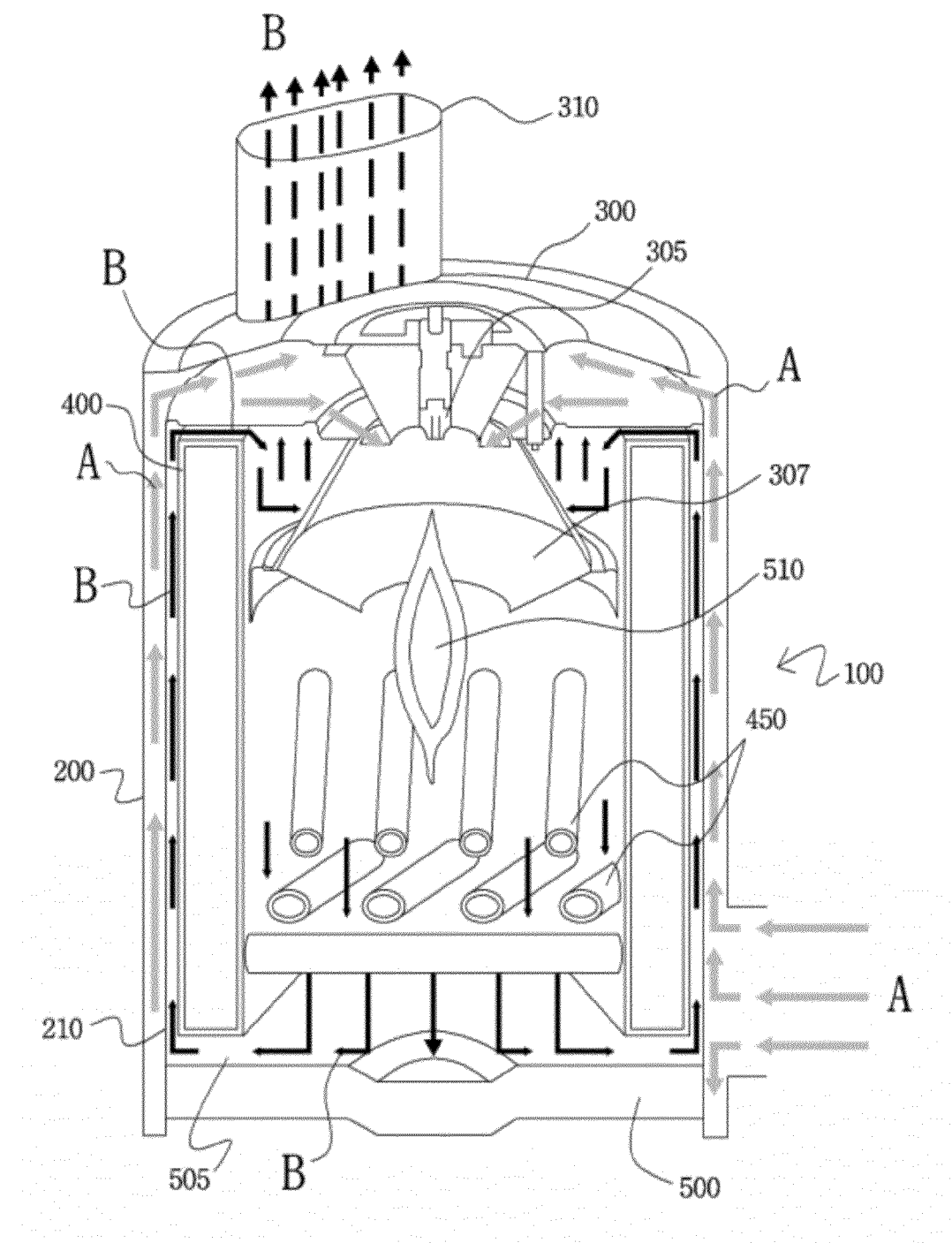
FIG. 2 is a cross-sectional view illustrating an exemplary embodiment of the present invention.
Figure 3:
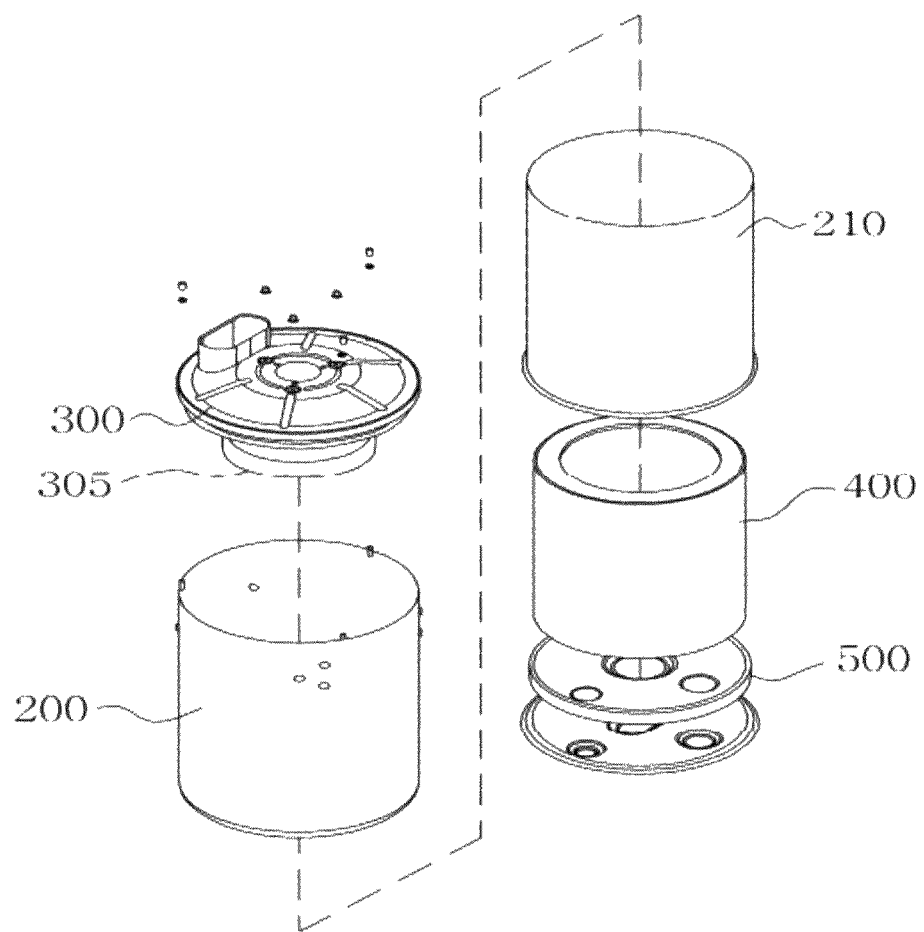
FIG. 3 is an exploded view illustrating main components of the boiler shown in FIG. 2.
Figure 4:
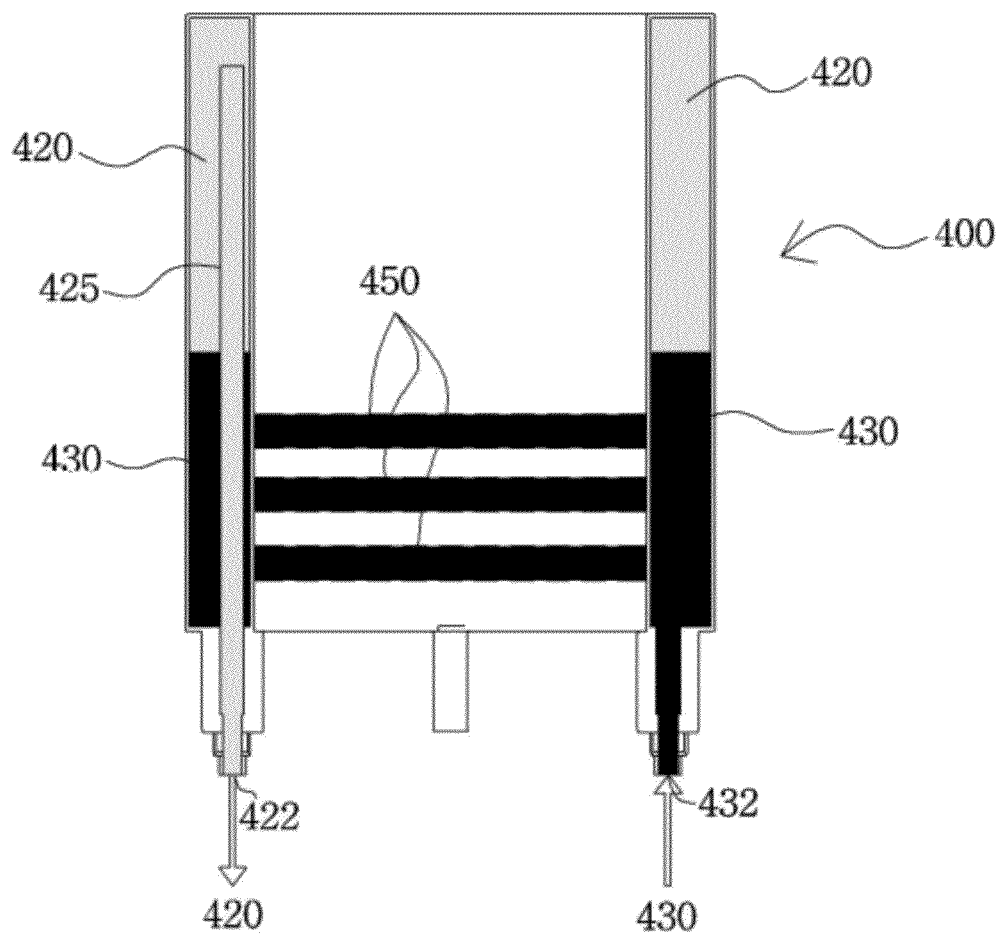
FIG. 4 is a view illustrating flows of steam and water inside a boiler body.

FIG. 1 is a schematic diagram illustrating a concept of the present invention, FIG. 2 is a perspective cross-sectional view illustrating an exemplary embodiment of the present invention, FIG. 3 is an exploded view illustrating main components of the boiler shown in FIG. 2, and FIG. 4 is a view illustrating flows of steam and water inside a boiler body.

As shown in FIG. 3, the main configuration of a steam boiler according to an exemplary embodiment of the present invention includes a boiler cover 300, an external cylinder 200 which is the outermost cylinder, an internal cylinder 210 formed inside the external cylinder 200, a boiler body 400 formed inside the internal cylinder 210, a firebrick 500 supporting the lower portion of the boiler and capable of withstanding high temperature, etc.

The reason why the exemplary embodiment of the present invention is called the smoke-pipe-type-cum-water-pipe-type boiler is as follows.

Discharge gas due to flames flows through a central through-hole of the boiler body 400. From this aspect, the exemplary embodiment can be seen as the smoke-pipe-type.

Further, a water pipe 450 is disposed to cross the central through-hole of the boiler body 400 and water is heated inside the water pipe. From this aspect, the exemplary embodiment can be seen as the water-pipe-type.

Therefore, the exemplary embodiment includes both the smoke-pipe-type structure and the water-pipe-type structure.

The principle and configuration of the exemplary embodiment of the present invention will be described with reference to FIG. 1.

The boiler body 400 accommodating water 430 and steam 420 therein and having a hollow cylinder shape is positioned at the center portion of the boiler. However, it is apparent that the boiler body 400 may have a shape different form the cylinder shape if necessary.

If the water 430 is supplied from one side of the boiler body 400 and is positioned at a lower side in the boiler body, the water 430 is heated by flames 510 to make steam 420. The steam 420 is positioned at an upper side in the boiler body 400 and then is rapidly discharged to the outside to be used for the purpose of a steam cleaner.

A burner 305 throwing flames into the central through-hole of the boiler body 400 is positioned over the center of the boiler body, and discharge gas B generated by combustion moves toward the bottom side.

In order to block the discharge gas B from being discharged from a portion direct on the boiler body 400, a discharge-gas blocking cover 307 is formed to cover the upper side of the central through-hole of the boiler body. Therefore, the discharge gas B is induced to flow through a lower discharge-gas path 505.

Referring to FIG. 2, it is preferable to form a plurality of water pipes 450 in order for quick heat transfer. Further, a number of water pipes 450 may be formed in the same plane. However, in order for quicker heat transfer, as shown in FIG. 2, it is preferable to form a number of water pipes 450 in a plurality of layers.

The number of layers may be 4 as shown in FIG. 1, or 3 as shown in FIG. 2. The number of layers may be appropriately changed according to the capacity of the boiler.

Further, it is preferable that the alignment directions of the water pipes 450 in the individual layers should be different from each other in order for the water pipes 450 to effectively directly receive the flames. It can be seen from FIG. 2 that water pipes in the uppermost layer are aligned in parallel with each other and water pipes in a layer located directly below the uppermost layer are aligned in parallel with each other while forming a predetermined angle with the water pipes in the uppermost layer.

Figure 5:
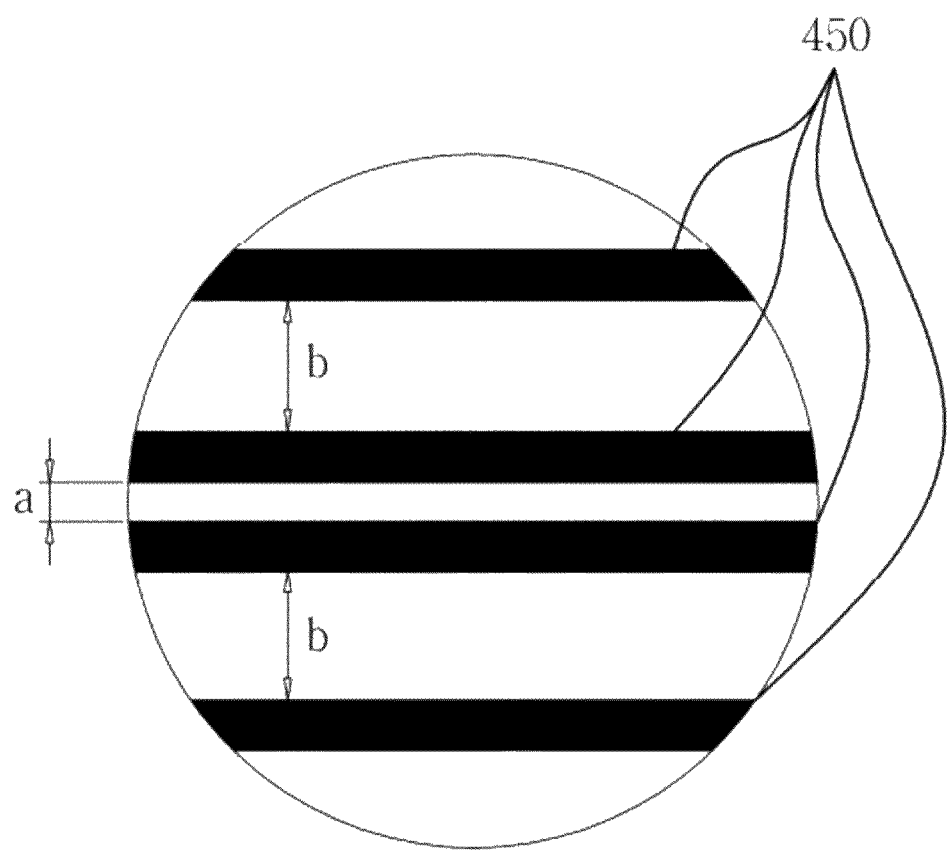
FIG. 5 is a view illustrating intervals between water pipes.

Meanwhile, the arrangement intervals between water pipes 450 formed on the same level to cross the inside of the central through-hole of the boiler body may be the same as each other as shown in FIG. 2. However, in order to more efficiently expose the water pipes 450 to the flames, it is possible to densely dispose the water pipes 450 at the center portion where there are flames. The reason is as follows. FIG. 5 is a view of the water pipes 450 as seen from the above. As shown in FIG. 5, it is preferable that the intervals b between the water pipes positioned on the outside should be slightly larger than or the same as the intervals (a) between the water pipes positioned in the center portion to which the flames are directly applied.

FIG. 4 shows the movements of the water 430 sucked through a water intake 432 and the steam 420 in more detail. The water 430 in the water pipes 450 heated by the flames evaporates into the steam 420 in the boiler body 400, and the steam 420 is discharged through a steam discharge pipe 425 and a steam outlet 422 at high speed, so as to fulfill the function of a steam cleaner.

Hereinafter, the flow of air A for combustion and the flow of the discharge gas B will be described.

Outside the boiler body 400, an internal cylinder 210 is formed. Between the boiler body 400 and the internal cylinder 210, the discharge gas B flows from the lower side to the upper side.

The discharge gas B passes between the water pipes 450, passes through the lower discharge-gas path 505 on the bottom, and is then discharged to the external air through a space between the outside wall surface of the boiler body 400 and the internal cylinder 210.

The heat energy of the discharge gas B is transferred to the air A for combustion with the internal cylinder 210 interposed therebetween so as to preheat the air before consumption. This configuration is completely different from a general boiler configuration in which burned discharge gas is directly discharged from the boiler.

In short, heat exchange between the air A injected for combustion and the discharge gas B is performed such that the higher-temperature air is used for combustion. Therefore, it is possible to use waste heat of the discharge gas. Further, since the heat exchange is performed on the outside of the boiler body, it is not necessarily required to separately provide a heat insulating material made of asbestos or glass fiber.

Another feature of the exemplary embodiment of the present invention is that it is unnecessary to provide a heat insulating material to the outside of the boiler body 400. That is, since the internal cylinder 210 and the external cylinder 200 cover the outside of the boiler body 400, it is not necessarily required to separately provide a heat insulating material to the outside of the boiler body.

The whole configuration of the steam boiler according to the exemplary embodiment of the present invention described above and the flow of the air and the flow of the discharge gas are shown in FIG. 2 in more detail.

The air A for combustion flows into the steam boiler from the right lower portion, moves toward the upper side of the boiler along the outermost space, and flows into the combustion chamber to be used for combustion of the burner 305. At this time, the air A for combustion receives heat from the discharge gas B while flowing, such that the higher-temperature air is used for combustion.

The flames 510 heat the top surfaces of the water pipes 450, but the discharge gas B is not leaked to the upper portion due to the discharge-gas blocking cover 307, instead, is discharged only through the lower discharge path 505 on the edge of the top surface of the firebrick 500.

The time period when the discharge gas B stays in the boiler is sufficiently secured such that the waste heat is used to heat the air for combustion as described above. In FIG. 2, for ease, the steam and water in the boiler body 400 is omitted.

Hereinafter, the effects of the exemplary embodiment of the present invention are summarized as follows.

That is, since the advantages of both the smoke-pipe-type and water-pipe-type boilers are applied, it is possible to have the same heat efficiency as the water-pipe-type boiler while having a light small-sized structure which is the advantage of the smoke-pipe-type boiler.

Further, since an up/down-type combustion method is taken to increase stay time of high-temperature gas in the vicinity of the boiler, it is possible to preheat air for combustion with waste heat of discharge gas, thereby significantly improving heat efficiency.

Furthermore, since the heat exchange structure between the air for combustion and the discharge gas is provided to the outside wall surface of the boiler, it is unnecessary to separately provide a heat insulating material using asbestos or the like unlike existing boilers. Therefore, there are effects such as improvement of the work environment for workers, a reduction in the weight of the product, an improvement in the manufacture cost, a reduction in the weight of the boiler, and so on.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A steam boiler, comprising:
   a boiler body accommodating water and steam therein;
   a burner throwing flames toward a central through-hole of the boiler body;
   water pipes formed to cross the inside of the central through-hole of the boiler body, and directly heated by the flames of the burner;
   an internal cylinder formed to cover the outside of the boiler body so as to form a space between the internal cylinder and the outer wall surface of the boiler body where burned discharge gas flows from the lower side to the upper side; and
   an external cylinder formed to cover the outside of the internal cylinder so as to form a space between the external cylinder and the outer wall surface of the internal cylinder where air for combustion flow such that heat exchange between the air for combustion and the discharge gas is performed,
   wherein a lower discharge-gas path is formed on the lower side of the boiler body and a discharge-gas blocking cover is formed on the upper side of the boiler body such that the discharge gas is discharged only through the lower gas path, and
   the discharge gas passing through the lower discharge-gas path is induced to flow from the lower side to the upper side in the space between the internal cylinder and the outer wall surface of the boiler body, such that the stay time of the discharge gas in the boiler is delayed.

2. The steam boiler of claim 1, wherein the water pipes are arranged in two or more layers such that water pipes in each layer are aligned in parallel with each other and the arrangement direction of the water pipes in each layer forms predetermined angles with the arrangement directions of water pipes in the other layers.

* * * * *